(12) United States Patent
Park (10) Patent No.: US 11,062,161 B1
(45) Date of Patent: Jul. 13, 2021

(54) METHODS AND DEVICES FOR OBJECT DETECTION AND OBJECT COLOR DETERMINATION

(71) Applicant: QUALCOMM Incorporated, San Diego, CA (US)

(72) Inventor: Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/824,558

(22) Filed: Mar. 19, 2020

(51) Int. Cl.
*G06K 9/00* (2006.01)
*G06K 9/20* (2006.01)
*G06K 9/46* (2006.01)

(52) U.S. Cl.
CPC .......... *G06K 9/2018* (2013.01); *G06K 9/4652* (2013.01)

(58) Field of Classification Search
CPC ....... H04N 19/00024; H04N 19/00139; H04N 19/00315; H04N 19/00448; H04N 1/40012; H04N 1/40018; H04N 1/40025; H04N 1/40031; H04N 1/40037; H04N 1/40043; H04N 1/4005; H04N 1/40056; H04N 1/40062; H04N 1/40068; H04N 1/40075; H04N 9/646; H04N 9/0451; H04N 17/002; H04N 17/02; H04N 1/64; H04N 1/506; G06T 3/40; G06T 3/4007; G06T 2207/20; G06T 3/00; G06T 3/0018; G06T 3/0031; G06T 3/0006; G06T 7/90; G06T 3/0062; G06F 16/5838; G06Q 30/0631

See application file for complete search history.

(56) References Cited

U.S. PATENT DOCUMENTS 9,467,666 B1 * 10/2016 Topliss .............. H04N 9/04557
2009/0200451 A1 * 8/2009 Conners ............. H04N 5/2351
250/208.1

* cited by examiner

*Primary Examiner* — Duy M Dang
(74) *Attorney, Agent, or Firm* — Weaver Austin Villeneuve & Sampson LLP (57) ABSTRACT

An apparatus may include an anti-color filter array proximate an array of optical sensor pixels. The anti-color filter array may include first anti-color filters. Each of the first anti-color filters may be located near a corresponding instance (or group of instances) of a first plurality of optical sensor pixels and may be configured to at least partially suppress transmission of light in a first optical wavelength range. In some examples, the first optical wavelength range may correspond to a first color. The anti-color filter array may include second anti-color filter regions, each of which may be located near a corresponding instance of a second plurality of optical sensor pixels. In some such examples, each of the second anti-color filter regions may be configured to at least partially suppress transmission of light in a second optical wavelength range.

30 Claims, 6 Drawing Sheets

METHODS AND DEVICES FOR OBJECT DETECTION AND OBJECT COLOR DETERMINATION

TECHNICAL FIELD

This disclosure relates generally to optical sensors and related methods.

DESCRIPTION OF THE RELATED TECHNOLOGY

Low-power optical sensors, such as those provided by the present assignee, provide both opportunities and challenges. Some low-power optical sensors provided by the present assignee consume milliwatts of power, including the power used by the optical sensor and the power consumed by associated processing. Some such optical sensor implementations are suitable for "always on" use cases, as well as battery power, low-cost, low-power, ultra-low power and TinyML (a collaborative effort between the embedded ultra-low power systems and machine learning communities) use cases. By way of comparison, a camera module in a smartphone generally consumes orders of magnitude more power, e.g., hundreds of milliwatts or in some cases watts of power. Some security cameras may consume yet more power.

In some instances, optical sensor pixel data from such low-power optical sensors may be used for detecting image changes and/or identifying objects. The present assignee's previously-deployed low-power optical sensors were sensitive to all optical wavelengths in the visible range. Such "monochrome" or greyscale optical sensors are advantageous because they can be very sensitive and therefore can have very good performance in low-light conditions.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus or a system. The apparatus or system may include an array of optical sensor pixels, an anti-color filter array proximate the array of optical sensor pixels and a control system configured for communication with the optical sensor. The anti-color filter array may include at least a first plurality of first anti-color filters. Each of the first anti-color filters may be proximate a corresponding instance of a first plurality of optical sensor pixels. Each of the first anti-color filters may be configured to at least partially suppress transmission of light in a first optical wavelength range.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be configured for receiving optical sensor pixel values from the array of optical sensor pixels, for analyzing the optical sensor pixel values to detect at least a first object and for determining first object color information. Determining the first object color information may involve obtaining at least one first optical sensor value from at least one first optical sensor pixel corresponding to the first object. The at least one first optical sensor pixel may be at least one instance of the first plurality of optical sensor pixels. Determining the first object color information may involve obtaining at least one second optical sensor value from at least one second optical sensor pixel corresponding to the first object. The at least one second optical sensor pixel may not be at least one instance of the first plurality of optical sensor pixels.

Determining the first object color information may involve comparing the at least one first optical sensor value and the at least one second optical sensor value. In some examples, determining the first object color information may involve aggregating optical sensor pixel values. In some instances, analyzing the optical sensor pixel values to detect at least a first object may involve comparing the optical sensor pixel values to a background model.

According to some implementations, the anti-color filter array may include a second plurality of second anti-color filters. In some instances, each of the second anti-color filters may be proximate a corresponding instance of a second plurality of optical sensor pixels. In some examples, each of the second anti-color filters may be configured to at least partially suppress transmission of light in a second optical wavelength range. According to some examples, the at least one second optical sensor pixel may be at least one instance of the second plurality of optical sensor pixels. In some examples, the anti-color filter array may include a plurality of transparent or substantially transparent regions.

In some instances, the anti-color filter array may include groups of identical anti-color filter patterns. In some such examples, each of the identical anti-color filter patterns may include at least one instance of the first anti-color filters and at least one instance of the second anti-color filters.

According to some implementations, the anti-color filter array may include a third plurality of third anti-color filters. In some such examples, each of the third anti-color filters may be proximate a corresponding instance of a third plurality of optical sensor pixels. In some examples, each of the third anti-color filters may be configured to at least partially suppress transmission of light in a third optical wavelength range. In some such examples, the control system may be configured for obtaining at least one third optical sensor value from at least one third optical sensor pixel corresponding to the first object. The at least one third optical sensor pixel may be at least one instance of the third plurality of optical sensor pixels. Determining the first object color information may involve comparing the at least one third optical sensor value with the at least one first optical sensor value and the at least one second optical sensor value. The anti-color filter array may, in some examples, include groups of identical anti-color filter patterns. Each of the identical anti-color filter patterns may, in some instances, include at least one instance of the first anti-color filters, at least one instance of the second anti-color filters and at least one instance of the third anti-color filters.

Other innovative aspects of the subject matter described in this disclosure can be implemented in a method. The method may involve receiving optical sensor pixel values from the array of optical sensor pixels, analyzing the optical sensor pixel values to detect at least a first object and determining first object color information. Determining the first object color information may involve obtaining at least one first optical sensor value from at least one first optical sensor pixel corresponding to the first object. The at least one first optical sensor pixel may be at least one instance of the first plurality of optical sensor pixels. Determining the first object color information may involve obtaining at least one second optical sensor value from at least one second optical sensor pixel corresponding to the first object. The at least one second optical sensor pixel may not be at least one instance of the first plurality of optical sensor pixels.

Determining the first object color information may involve comparing the at least one first optical sensor value and the at least one second optical sensor value. In some examples, determining the first object color information may involve aggregating optical sensor pixel values. In some instances, analyzing the optical sensor pixel values to detect at least a first object may involve comparing the optical sensor pixel values to a background model.

In some examples, the at least one second optical sensor pixel may be at least one instance of a second plurality of optical sensor pixels having received light that is suppressed in a second optical wavelength range. In some implementations, determining the first object color information may involve obtaining at least one third optical sensor value from at least one third optical sensor pixel corresponding to the first object. The at least one third optical sensor pixel may be at least one instance of a third plurality of optical sensor pixels having received light that is suppressed in a third optical wavelength range. Determining the first object color information may involve comparing the at least one third optical sensor value with the at least one first optical sensor value and the at least one second optical sensor value. In some instances, determining the first object color information may involve aggregating optical sensor pixel values. According to some examples, analyzing the optical sensor pixel values to detect at least a first object may involve comparing the optical sensor pixel values to a background model.

Another innovative aspect of the subject matter described in this disclosure can be implemented in an apparatus or a system. The apparatus or system may include an array of optical sensor pixels, an anti-color filter array proximate the array of optical sensor pixels, an interface system and a control system. The anti-color filter array may include at least a first plurality of first anti-color filters. Each of the first anti-color filters may be proximate a corresponding instance of a first plurality of optical sensor pixels. Each of the first anti-color filters may be configured to at least partially suppress transmission of light in a first optical wavelength range.

According to some implementations, the anti-color filter array may include a second plurality of second anti-color regions. In some instances, each of the second anti-color regions may be proximate a corresponding instance of a second plurality of optical sensor pixels. In some examples, at least some of the second anti-color filter regions are not configured to suppress transmission of light in the first optical wavelength range. In some examples, the anti-color filter array may include a plurality of transparent or substantially transparent regions.

The control system may be configured for receiving, from a device and via the interface system, a request for optical sensor pixel values from the array of optical sensor pixels. The optical sensor pixel values may include first optical sensor pixel values corresponding to the first plurality of optical sensor pixels and second optical sensor pixel values corresponding to the second plurality of optical sensor pixels. The control system may be configured for obtaining the optical sensor pixel values and for transmitting, via the interface system, the optical sensor pixel values to the device.

In some implementation, the second plurality of second anti-color filter regions may include a second plurality of second anti-color filters. In some such implementations, each of the second anti-color filters may be proximate a corresponding instance of the second plurality of optical sensor pixels. In some examples, each of the second anti-color filters may be configured to at least partially suppress transmission of light in a second optical wavelength range.

In some instances, the anti-color filter array may include groups of identical anti-color filter patterns. In some such examples, each of the identical anti-color filter patterns may include at least one instance of the first anti-color filters and at least one instance of the second anti-color filters. In some examples, the anti-color filter array may include at least one instance of the third anti-color filters.

According to some implementations, the anti-color filter array may include a third plurality of third anti-color filters. In some such examples, each of the third anti-color filters may be proximate a corresponding instance of a third plurality of optical sensor pixels. In some examples, each of the third anti-color filters may be configured to at least partially suppress transmission of light in a third optical wavelength range. In some such examples, the control system may be configured for obtaining at least one third optical sensor value from at least one third optical sensor pixel corresponding to the first object. The at least one third optical sensor pixel may be at least one instance of the third plurality of optical sensor pixels.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method. The method may involve receiving optical sensor pixel values from an array of optical sensor pixels, analyzing the optical sensor pixel values to detect at least a first object and determining first object color information. In some implementations, determining the first object color information may involve obtaining at least one first optical sensor value from at least one first optical sensor pixel corresponding to the first object. The at least one first optical sensor pixel may be at least one instance of a first plurality of optical sensor pixels having received light that is suppressed in a first optical wavelength range.

In some examples, determining the first object color information may involve obtaining at least one second optical sensor value from at least one second optical sensor pixel corresponding to the first object, the at least one second optical sensor pixel not being at least one instance of the first plurality of optical sensor pixels. In some implementations, determining the first object color information may involve comparing the at least one first optical sensor value and the at least one second optical sensor value. In some examples, the at least one second optical sensor pixel may be at least one instance of a second plurality of optical sensor pixels having received light that is suppressed in a second optical wavelength range.

In some implementations, determining the first object color information may involve obtaining at least one third optical sensor value from at least one third optical sensor pixel corresponding to the first object. The at least one third optical sensor pixel may be at least one instance of a third plurality of optical sensor pixels having received light that is suppressed in a third optical wavelength range. In some such implementations, determining the first object color information may involve comparing the at least one third optical sensor value with the at least one first optical sensor value and the at least one second optical sensor value. According to some examples, determining the first object color information may involve aggregating optical sensor pixel values. In some implementations, analyzing the optical sensor pixel values to detect at least a first object may involve comparing the optical sensor pixel values to a background model.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes an apparatus or system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, handheld or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Various implementations disclosed herein may include an apparatus that has an anti-color filter array proximate an array of optical sensor pixels. The anti-color filter array may include first anti-color filters. Each of the first anti-color filters may be located near a corresponding instance (or group of instances) of a first plurality of optical sensor pixels. Each of the first anti-color filters may be configured to at least partially suppress transmission of light in a first optical wavelength range. According to some examples, the first anti-color filters may be notch filters. In some examples, the first optical wavelength range may correspond to a first color. The anti-color filter array may, in some instances, include second anti-color filter regions. Each of the second anti-color filter regions may be located near a corresponding instance of a second plurality of optical sensor pixels. In some examples, each of the second anti-color filter regions is not configured to suppress transmission of light in the first optical wavelength range. In some such examples, each of the second anti-color filter regions may be configured to at least partially suppress transmission of light in a second optical wavelength range. The anti-color filter array may, in some examples, include additional anti-color filter regions.

A control system may be configured for receiving optical sensor pixel values from the array of optical sensor pixels, for analyzing the optical sensor pixel values to detect at least a first object and for determining first object color information. Determining the first object color information may involve obtaining at least one first optical sensor value from at least one instance of the first plurality of optical sensor pixels and obtaining at least one second optical sensor value from at least one instance of the second plurality of optical sensor pixels corresponding to the first object, and comparing the first optical sensor value(s) and the second optical sensor value(s). In some examples, the control system may be part of the apparatus that includes the anti-color filter array and the array of optical sensor pixels, whereas in other examples the control system may reside in another device that is configured for communication with the apparatus.

Particular implementations of the subject matter described in this disclosure can be implemented to realize one or more of the following potential advantages. In some instances, it may be beneficial both to determine an object type (e.g., an apple) and to determine object color information (e.g., whether the apple is red or green, more red than green, more green than red, etc.). Prior color-determination methods were generally based upon input from optical sensor pixels having associated color filters, such as Bayer color filters. Each of the color filters would pass a wavelength range (e.g., a wavelength range corresponding to red, green or blue light) and suppress other wavelength ranges. Therefore, such color filters would typically block much more of the light that otherwise could have been received by the optical sensor pixels. Some disclosed anti-filter methods and devices can provide relatively greater light sensitivity and therefore improved performance, particularly when the ambient light intensity is relatively low. The improved performance may include a relatively lower exposure time and/or a relatively lower gain when the ambient light intensity is low.

The disclosed anti-filter methods and devices may be particularly beneficial when implemented by, or in conjunction with, a low-power optical sensor and/or an optical sensor having a relatively low bit width. The associated processes of determining object color information can be performed without the computational overhead that is required, for example, to produce realistic color images, eliminate artifacts that may potentially be caused by a color filter, etc. For many use cases, it may be unnecessary to determine detailed object color information: merely knowing whether, e.g., an apple is more red than green, whether a car is red or blue, etc., may be sufficient.

Figure 1:
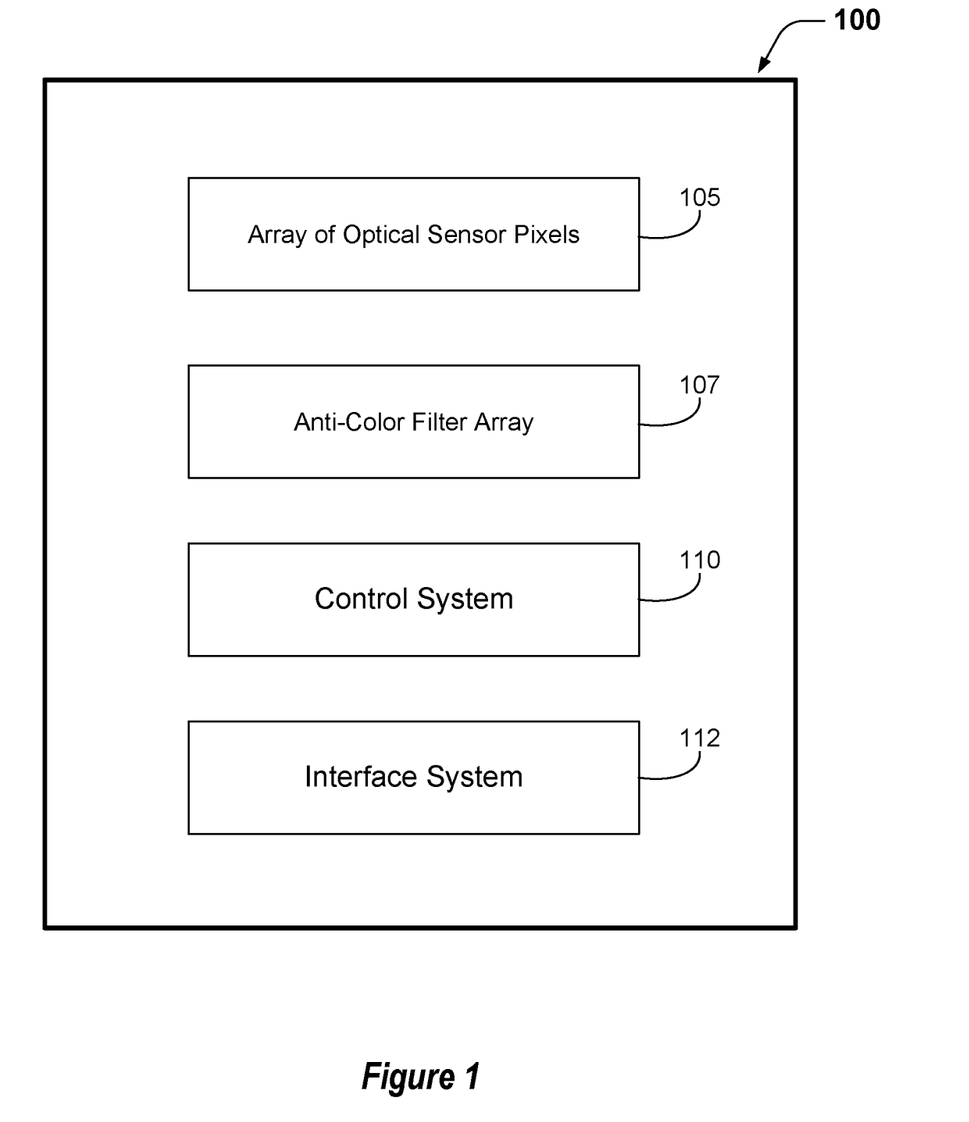
FIG. 1 is a block diagram that shows example components of an apparatus according to some implementations.

FIG. 1 is a block diagram that shows example components of an apparatus according to some implementations. In this example, the apparatus 100 includes an array of optical sensor pixels 105, an anti-color filter array 107 proximate the array of optical sensor pixels 105 and a control system 110 that is configured to communicate with the array of optical sensor pixels 105. In this example, the apparatus 100 includes an interface system 112.

In some examples, the anti-color filter array 107 may include a first plurality of first anti-color filters. As used herein, the term "anti-color filter" refers generally to a filter that is configured to at least partially suppress transmission of light in an optical wavelength range. In some instances, the optical wavelength range may correspond to, or be within the range of, a color of the visible spectrum, such as violet (380-450 nm), blue (450-485 nm), cyan (485-500 nm), green (500-565 nm), yellow (565-590 nm), orange (590-625 nm) or red (625-740 nm). In some implementations, the optical wavelength range may correspond to a wavelength range that is shorter or longer than the wavelength range of the visible spectrum, such as an infrared or ultraviolet wavelength range.

According to some such examples, each of the first anti-color filters may be proximate a corresponding instance (or group of instances) of a first plurality of optical sensor pixels. In some such examples, each of the first anti-color filters may be configured to at least partially suppress transmission of light in a first optical wavelength range. Various examples are provided herein.

In some implementations, the anti-color filter array 107 may include a second plurality of second anti-color filter regions. In some such implementations, the second plurality of second anti-color filter regions may include a second plurality of second anti-color filters. Each of the second anti-color filters may be proximate a corresponding instance (or group of instances) of a second plurality of optical sensor pixels. In some such implementations, each of the second anti-color filters may be configured to at least partially suppress transmission of light in a second optical wavelength range. Alternatively, or additionally, in some implementations the second plurality of second anti-color filter regions may include one or more substantially transparent regions.

In some implementations, the anti-color filter array 107 may include a third plurality of third anti-color filter regions. In some such implementations, the third plurality of third anti-color filter regions may include a third plurality of third anti-color filters. Each of the third anti-color filters may be proximate a corresponding instance (or group of instances) of a third plurality of optical sensor pixels. In some such implementations, each of the third anti-color filters may be configured to at least partially suppress transmission of light in a third optical wavelength range. Alternatively, or additionally, in some implementations the third plurality of third anti-color filter regions may include one or more substantially transparent regions.

Some implementations of the anti-color filter array 107 may include more than three anti-color filter regions. Some such implementations may include one or more substantially transparent regions and/or an $N^{th}$ plurality of $N^{th}$ anti-color filters, where N is an integer greater than or equal to four. Each of the $N^{th}$ anti-color filters may be configured to at least partially suppress transmission of light in an $N^{th}$ optical wavelength range.

The control system 110 may be configured to communicate with the array of optical sensor pixels 105 via wired communication and/or wireless communication. As used herein, the term "coupled to" includes being physically coupled for wired communication as well as being configured for wireless communication.

According to some implementations, the apparatus 100 may be a single device, whereas in other implementations the apparatus 100 may include more than one device. Accordingly, the terms "apparatus" and "system" may be used interchangeably herein. In other examples, the apparatus 100 may be a component of another device. For example, in some implementations at least a portion of the array of optical sensor pixels 105 and/or the control system 110 may be included in more than one apparatus. In some examples, a second device may include some or all of the control system 110, but may not include the array of optical sensor pixels 105. However, the control system 110 may nonetheless be configured to communicate with the array of optical sensor pixels 105.

The control system 110 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 110 also may include (and/or be configured for communication with) one or more memory devices, such as one or more random access memory (RAM) devices, read-only memory (ROM) devices and/or other types of non-transitory media. Accordingly, the apparatus 100 may have a memory system that includes one or more memory devices, though the memory system is not shown in FIG. 1.

The control system 110 may be capable of performing, at least in part, the methods disclosed herein. In some examples, the control system 110 may be capable of performing some or all of the methods described herein according to instructions (e.g., software) stored on non-transitory media. For example, the control system 110 may be configured for controlling the array of optical sensor pixels 105 and/or for receiving and processing data from at least a portion of the array of optical sensor pixels 105, e.g., as described below.

In some examples, the array of optical sensor pixels 105 may be part of an image sensor that includes one or more lenses. Although shown as separate components in FIG. 1, the array of optical sensor pixels 105 may, in some examples, include at least a portion of the control system 110. For example, the array of optical sensor pixels 105 may include one or more processors in some instances. According to some implementations, the array of optical sensor pixels 105 may include a complementary metal-oxide-semiconductor (CMOS) sensor. Some such implementations of the array of optical sensor pixels 105 may include a processor configured to control exposure settings. The sensor and the processor may or may not reside on the same die, depending on the particular implementation. In some examples, the array of optical sensor pixels 105 may be, or may include, Qualcomm's Glance image sensor, one implementation of which has a 320 by 240 array of pixels and an 8-bit width, and consumes milliwatts of power, including the power used by the optical sensor and the power consumed by associated processing. By way of comparison, a camera module in a smartphone generally consumes hundreds of milliwatts of power, or in some cases watts of power.

In some examples, the interface system 112 may include a wireless interface system. In some implementations, the interface system 112 may include a network interface, an interface between the control system 110 and the array of optical sensor pixels 105, an interface between the control system 110 and a memory system and/or an interface between the control system 110 and an external device interface (e.g., a port or an applications processor). In some examples, the interface system 112 may include one or more user interfaces, such as a display, a touch screen, a microphone, etc.

Figure 2:
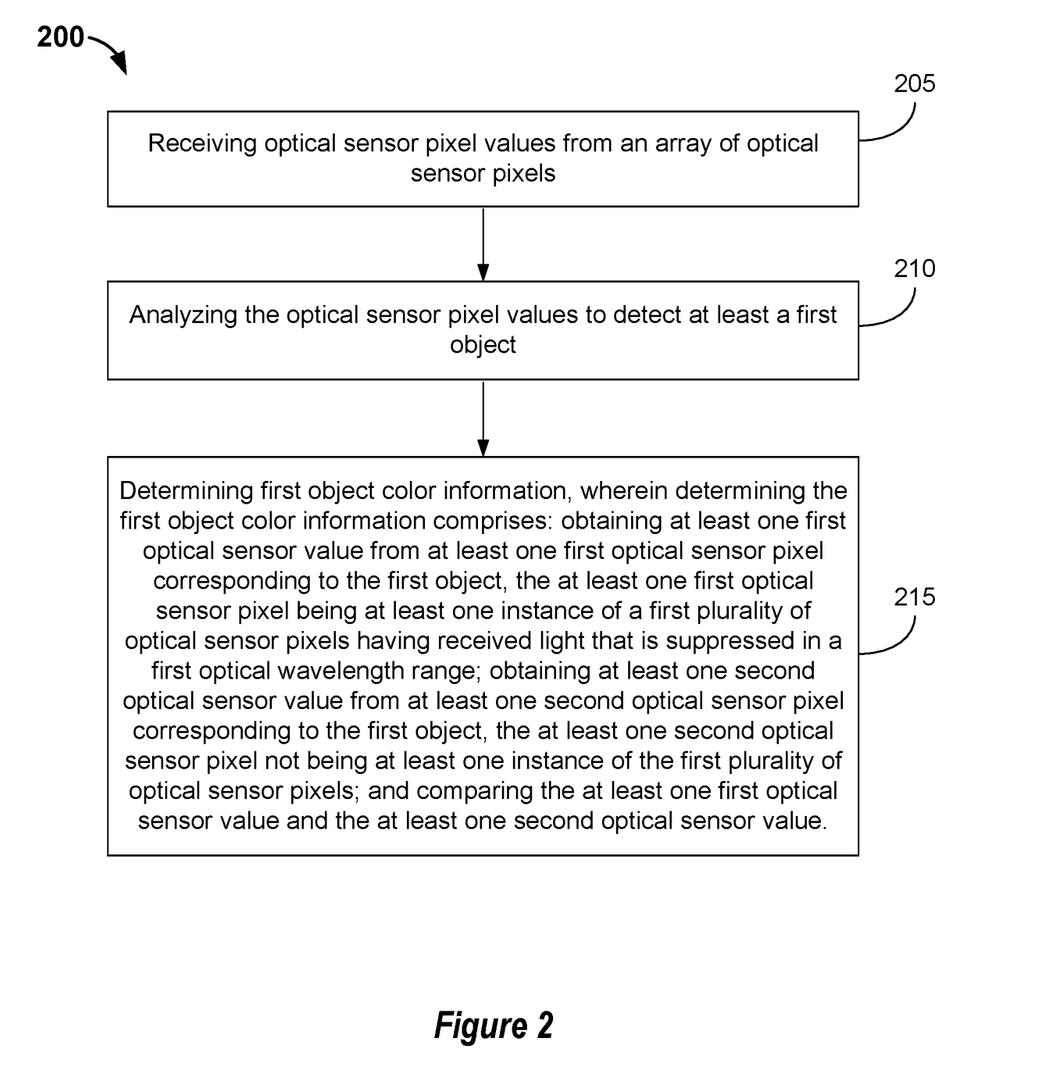
FIG. 2 is a flow diagram that provides examples of operations according to some disclosed methods.

FIG. 2 is a flow diagram that provides examples of operations according to some disclosed methods. The blocks of FIG. 2 (and those of other flow diagrams provided herein) may, for example, be performed by the apparatus 100 of FIG. 1, by a similar apparatus or by a system that includes one or more such devices. As with other methods disclosed herein, the method outlined in FIG. 2 may include more or fewer blocks than indicated. Moreover, the blocks of methods disclosed herein are not necessarily performed in the order indicated.

In this example, block 205 involves receiving optical sensor pixel values from an array of optical sensor pixels. According to some implementations, block 205 may involve a control system of an apparatus receiving the optical sensor pixel values from an array of optical sensor pixels that resides in the same apparatus. However, in other implementations, block 205 may involve a control system of an apparatus receiving the optical sensor pixel values from an array of optical sensor pixels that resides in a different apparatus.

According to this example, block 210 involves analyzing the optical sensor pixel values to detect at least a first object. In some examples, block 210 may involve a background subtraction process. It is often the case that an image's region(s) of interest (ROI) are objects (such as humans, animals, cars, etc.) in the image's foreground. As noted above, background subtraction is one method for distinguishing the background from the ROI. Background subtraction may be based, at least in part, on detected image changes between a current frame and a reference frame, which may be called a "background model." Image change detection may be used for detecting moving objects in a video stream, such as a video stream from a security camera, a video stream from a doorbell camera, a video stream from a baby monitor camera, a video stream from a camera associated with a voice-controlled device, etc. (As used herein, the term "camera" may be used to refer to any one of a range of devices having varying capabilities and complexities, including security cameras, simple optical sensors, etc.) For example, a current pixel, or a current group of pixels, may be considered to be part of the foreground if the difference between the current pixel (or the current group of pixels) and a corresponding portion of the background model is greater than or equal to a threshold value.

According to some examples, block 210 may involve applying one or more pattern recognition methods. Some pattern recognition methods may involve applying a feature selection process prior to applying a pattern-matching algorithm. Some such pattern recognition methods may, in some instances, involve applying a classifier, such as a probabilistic classifier. In some examples, block 210 and/or block 215 may involve "binning" or otherwise aggregating optical sensor pixel values. Some examples are described below.

In some instances, it may be beneficial both to determine a first object type (e.g., to determine that a detected first object is an automobile) and to determine object color information (e.g., whether the automobile is green or blue, more green than blue, more blue than red, etc.). Accordingly, in this example block 215 involves determining first object color information. Here, block 215 involves obtaining at least one first optical sensor value from at least one first optical sensor pixel corresponding to the first object. In this example, the at least one first optical sensor pixel is at least one instance of a first plurality of optical sensor pixels having received light that is suppressed in a first optical wavelength range. The at least one first optical sensor pixel may, for example, be proximate at least one corresponding first anti-color filter that is configured to at least partially suppress transmission of light in the first optical wavelength range. The at least one corresponding first anti-color filter may correspond to at least one first region of an anti-color filter array.

According to this implementation, block 215 involves obtaining at least one second optical sensor value from at least one second optical sensor pixel corresponding to the first object. In this example, the at least one second optical sensor pixel is not at least one instance of the first plurality of optical sensor pixels. Accordingly, the at least one second optical sensor pixel is at least one instance of a second plurality of optical sensor pixels having received light that is not suppressed in the first optical wavelength range. The at least one second optical sensor pixel may, for example, be proximate at least one corresponding second anti-color filter that is configured to at least partially suppress transmission of light in a second optical wavelength range. However, in some instances the at least one second optical sensor pixel may be proximate at least one substantially transparent region of the anti-color filter array.

According to this example, block 215 involves comparing the at least one first optical sensor value and the at least one second optical sensor value. For example, suppose that a first optical sensor pixel and a second optical sensor pixel both received light from the same object. Suppose further that the first optical sensor pixel received light filtered by a first anti-color filter that suppressed the transmission of light in a wavelength range corresponding to a first color. Let us also suppose that the second optical sensor pixel received light from a second region of an anti-color array that does not suppress the transmission of light in a wavelength range corresponding to the first color.

According to one such example, the second region of the anti-color array may be transparent, or substantially transparent, in the wavelength range that is visible to human beings (roughly 380 nm to 740 nm). As used herein, "substantially transparent" may refer to light transmission of nearly 100% in a particular wavelength range, such as the visible spectrum. "Nearly 100%" may refer to an average percentage of light transmission and/or to a minimum percentage of light transmission, e.g., an average of at least 99% transmission within a particular wavelength range, an average of at least 98% transmission within the wavelength range, an average of at least 97% transmission within the wavelength range, an average of at least 96% transmission within the wavelength range, an average of at least 95% transmission within the wavelength range, an average of at least 94% transmission within the wavelength range, etc.

According to this example, if a first optical sensor value corresponding to the first optical sensor pixel is lower than a second optical sensor value corresponding to the second optical sensor pixel, it is likely that the object's color is the first color. This is true because both optical sensor values correspond to light received from the same object. Assuming that both optical sensor pixels are functioning properly, the reason that first optical sensor value is lower should be that less light was received from the object in the first wavelength range.

For example, suppose that the first optical sensor pixel and the second optical sensor pixel both received light from an apple. Suppose further that the first optical sensor pixel received light filtered by a first anti-color filter that suppressed the transmission of light in a wavelength range corresponding to the color red (625-740 nm). Such an anti-color filter may be referred to herein as an "anti-red filter." According to this example, if the first optical sensor value is lower than the second optical sensor value, it is likely that the object's color is red.

The degree to which an anti-color filter will affect a corresponding optical sensor pixel value may depend on various factors, including but not limited to the wavelength range within which light transmission is suppressed by the anti-color filter and the degree to which light transmission is suppressed by the anti-color filter within that wavelength range. Some examples are described below with reference to FIGS. 3A-3C.

Therefore, the variation in optical sensor pixel values that will be evaluated in block 215 may also depend, either directly or indirectly, on these factors. In one simple example, suppose that the first anti-color filter were an "anti-red filter" configured to suppress the total amount of light received from a red object (and detected by a corresponding optical sensor pixel) by approximately 10%. Suppose also that the second optical sensor pixel received light from a transparent region of an anti-color array. In one such example, block 215 may involve determining whether the second optical sensor value exceeds the first optical sensor value by approximately 10%, or by at least a threshold value that is less than 10% (e.g., a threshold value of 5%, of 6%, of 7%, of 8%, of 9%, etc.). According to one such example, if the first optical sensor value is at least 5% lower than the second optical sensor value, it may be determined in block 215 that the object's color is red.

In some such examples, multiple instances of first optical sensor values and multiple instances of second optical sensor values may be summed or averaged before the comparison of block 215. Using multiple instances of first and second optical sensor values can reduce potential error caused by optical sensor pixel variability.

In another such example, the second region of the anti-color array may suppress the transmission of light in a different wavelength range, e.g., a wavelength range corresponding to a second color. Such examples may be relatively more useful when an object is likely to be either the first color or the second color, but not both. According to one such example, if a first optical sensor value corresponding to the first optical sensor pixel is lower than a second optical sensor value corresponding to the second optical sensor pixel, it is likely that the object's color is the first color. However, if the first optical sensor value is higher than the second optical sensor value, it is likely that the object's color is the second color. In some such examples, multiple instances of first optical sensor values and multiple instances of second optical sensor values may be summed or averaged before the comparison of block 215.

As noted elsewhere herein, in some implementations the anti-color filter array 107 may include a third plurality of third anti-color filter regions. In some such implementations, the third plurality of third anti-color filter regions may include a third plurality of third anti-color filters. Each of the third anti-color filters may be proximate a corresponding instance (or group of instances) of a third plurality of optical sensor pixels. In some such implementations, the third plurality of third anti-color filter regions may include one or more transparent or substantially transparent regions. Alternatively, or additionally, in some implementations each of the third anti-color regions may include filters configured to at least partially suppress transmission of light in a third optical wavelength range.

In some such implementations, method 200 may involve obtaining at least one third optical sensor value from at least one third optical sensor pixel corresponding to the first object. According to some such examples, the comparison of block 215 may involve comparing the at least one third optical sensor value with the at least one first optical sensor value and the at least one second optical sensor value.

For example, suppose that a first optical sensor pixel, a second optical sensor pixel and a third optical sensor pixel all received light from the same object. Suppose further that the first optical sensor pixel received light filtered by a first anti-color filter that suppressed the transmission of light in a wavelength range corresponding to a first color. Let us also suppose that the second optical sensor pixel received light from a second region of an anti-color array that suppressed the transmission of light in a wavelength range corresponding to a second color and that the third optical sensor pixel received light from a third region of an anti-color array that is transparent or substantially transparent. If the third optical sensor value and the first optical sensor value are both greater than the second optical sensor value, it is likely that the object is the second color. If the third optical sensor value and the second optical sensor value are both greater than the first optical sensor value, it is likely that the object is the first color. If the third optical sensor value is greater than both the first optical sensor value and the second optical sensor value, it is likely that the object includes both the first color and the second color.

In another example, suppose that that the first optical sensor pixel received light filtered by a first anti-color filter that suppressed the transmission of light in a wavelength range corresponding to a first color, the second optical sensor pixel received light from a second region of an anti-color array that suppressed the transmission of light in a wavelength range corresponding to a second color and that the third optical sensor pixel received light from a third region of an anti-color array that suppressed the transmission of light in a wavelength range corresponding to a third color. If the third optical sensor value and the first optical sensor value are both greater than the second optical sensor value, it is likely that the object is the second color. If the third optical sensor value and the second optical sensor value are both greater than the first optical sensor value, it is likely that the object is the first color. If the third optical sensor value is less than both the first optical sensor value and the second optical sensor value, it is likely that the object is the third color.

As noted elsewhere herein, some implementations of the anti-color filter array 107 may include more than three anti-color filter regions. Some such implementations may include one or more substantially transparent regions and/or an $N^{th}$ plurality of $N^{th}$ anti-color filters, where N is an integer greater than or equal to four. Each of the $N^{th}$ anti-color filters may be configured to at least partially suppress transmission of light in an $N^{th}$ optical wavelength range.

In some such implementations, method 200 may involve obtaining at least first through $N^{th}$ optical sensor values from at least first through $N^{th}$ optical sensor pixels corresponding to the first object. In some such examples, the first through $N^{th}$ optical sensor pixels may correspond to first through $N^{th}$ regions of the anti-color filter array 107. According to some such examples, the comparison of block 215 may involve comparing each of the first through $N^{th}$ optical sensor values with one another.

As noted elsewhere herein, the degree to which an anti-color filter will affect a corresponding optical sensor pixel value may depend on various factors. These factors may include, but are not limited to, the wavelength range within which light transmission is suppressed by the anti-color filter and the degree to which light transmission is suppressed by the anti-color filter within that wavelength range.

Figure 3A:
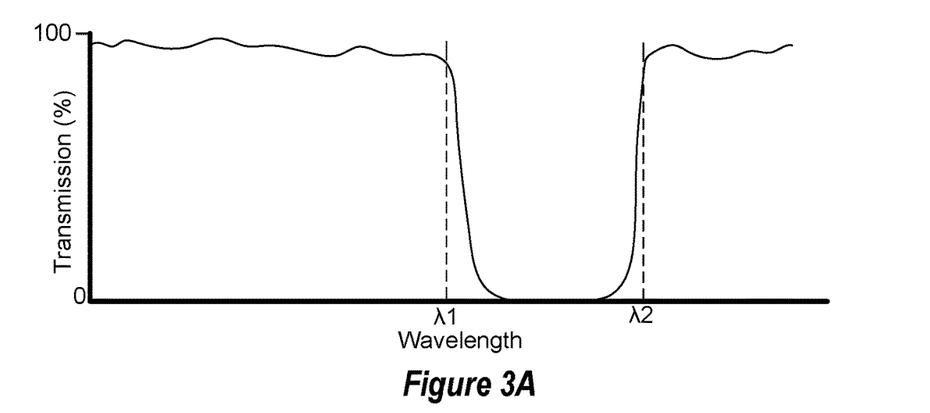
FIGS. 3A, 3B and 3C are graphs that show examples of the transmission of light by anti-color filters as functions of wavelength.
Figure 3B:
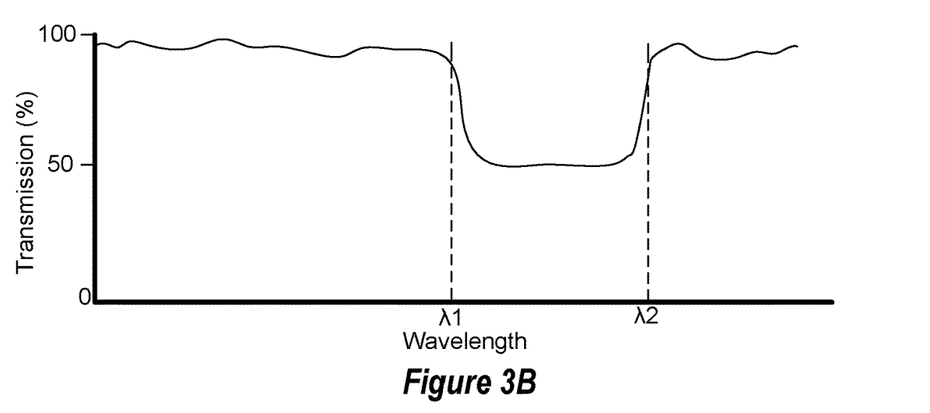
Figure 3C:
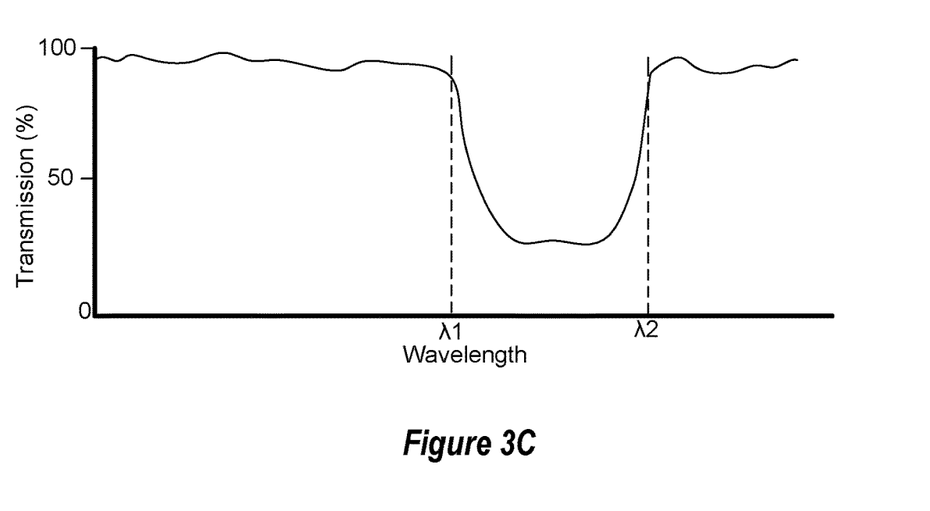

FIGS. 3A, 3B and 3C are graphs that show examples of the transmission of light by anti-color filters as functions of wavelength. The details of each graph, including the transmission within and outside of the wavelength range between $\lambda 1$ and $\lambda 2$, as well as the wavelength range between areas of minimum transmission and areas of maximum transmission, are merely made by way of example. As noted elsewhere herein, the term "anti-color filter" as used in this disclosure refers generally to a filter that is configured to at least partially suppress transmission of light in a wavelength range. In the examples shown in FIGS. 3A-3C, the wavelength range is between wavelength $\lambda 1$ and wavelength $\lambda 2$. In some instances, the wavelength range between $\lambda 1$ and $\lambda 2$ may correspond to, or be within the range of, a color of the visible spectrum, such as violet (380-450 nm), blue (450-485 nm), cyan (485-500 nm), green (500-565 nm), yellow (565-590 nm), orange (590-625 nm) or red (625-740 nm).

Accordingly, the values of $\lambda 1$ and $\lambda 2$ may vary according to the particular implementation. In one example of an "anti-red filter," $\lambda 1$ may be 600 nm and $\lambda 2$ may be 780 nm. In another example of an "anti-red filter," $\lambda 1$ may be 600 nm and $\lambda 2$ may be 800 nm. In another example of an "anti-red filter," $\lambda 1$ may be 620 nm and $\lambda 2$ may be 750 nm.

In some implementations, the relevant optical wavelength range may correspond to a wavelength range that is shorter or longer than the wavelength range of the visible spectrum, such as an infrared or ultraviolet wavelength range. The relevant optical wavelength range may, for example, correspond to a wavelength range that is detectable by optical sensor pixels of the apparatus 100.

FIG. 3A shows an example in which the transmission of light by an anti-color filter approaches zero percent within some parts of the wavelength range between $\lambda 1$ and $\lambda 2$. Outside this wavelength range, the transmission of light by the anti-color filter is generally between 90% and 100%.

FIG. 3B shows an example in which the transmission of light by an anti-color filter is reduced to approximately fifty percent within some parts of the wavelength range between $\lambda 1$ and $\lambda 2$. Outside this wavelength range, the transmission of light by the anti-color filter is generally between 90% and 100%.

FIG. 3C shows an example in which the transmission of light by an anti-color filter is reduced to approximately seventy-five percent within some parts of the wavelength range between $\lambda 1$ and $\lambda 2$. Outside this wavelength range, the transmission of light by the anti-color filter is generally between 90% and 100%.

Figure 4A:
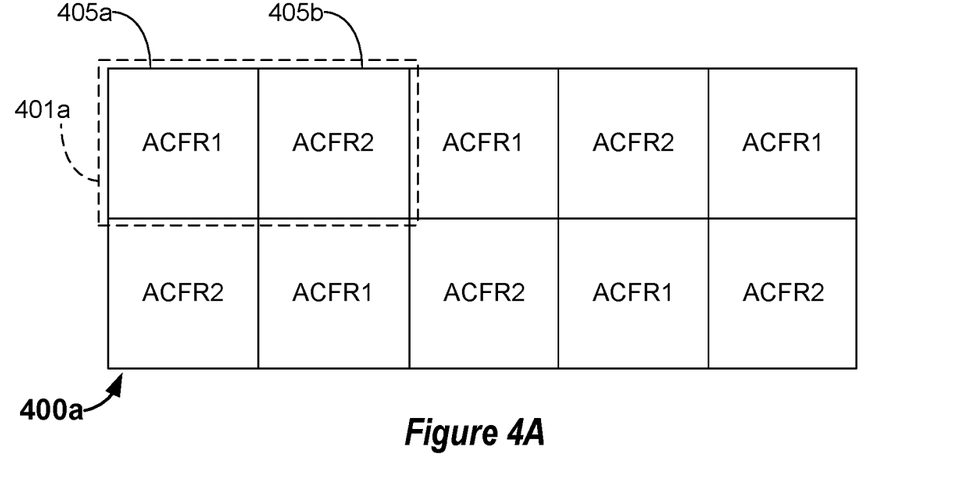
FIGS. 4A, 4B and 4C show examples of various arrangements of anti-color filter regions.
Figure 4B:
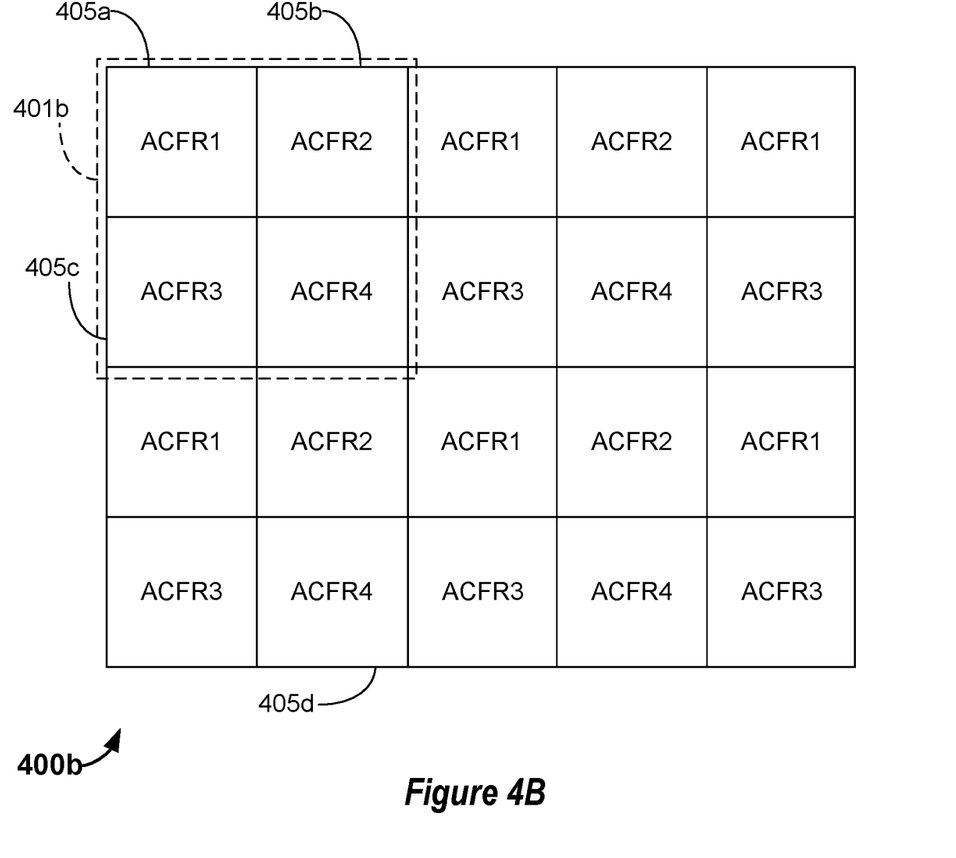
Figure 4C:
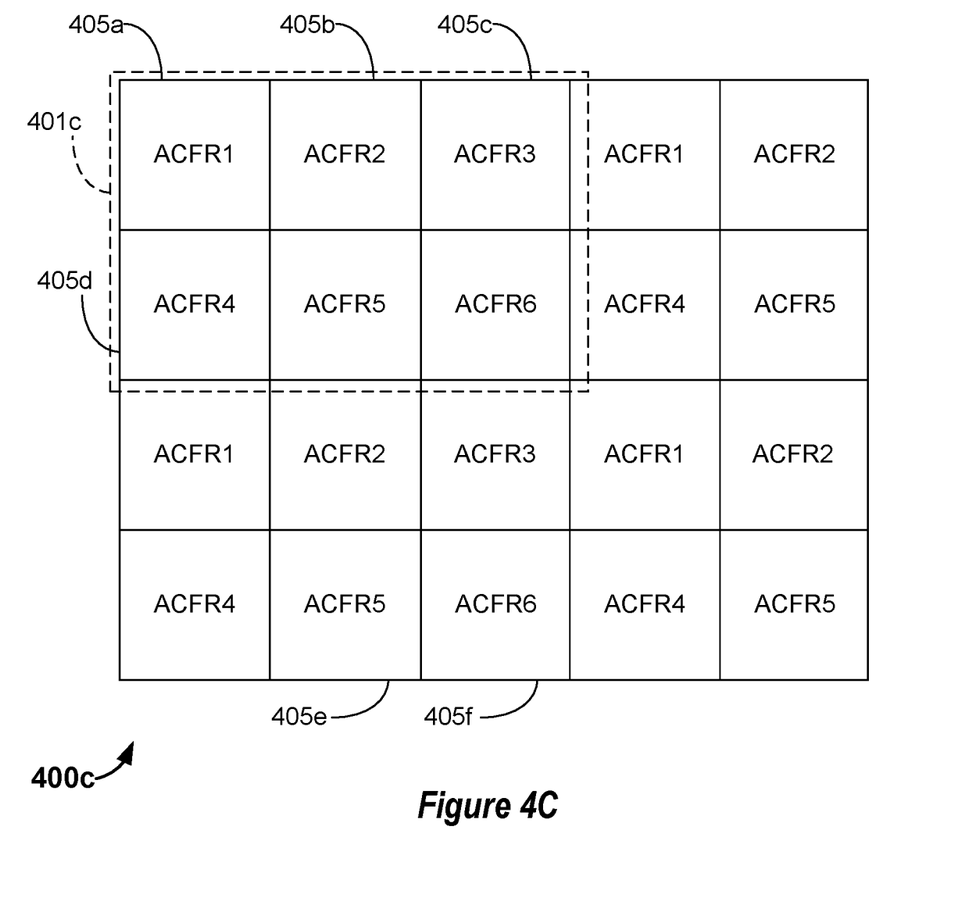

FIGS. 4A, 4B and 4C show examples of various arrangements of anti-color filter regions. Each of these examples includes groups of identical anti-color filter patterns. As with other figures presented herein, the particular types and arrangements of anti-color filter regions that are shown in FIGS. 4A, 4B and 4C (and described with reference to FIGS. 4A, 4B and 4C) are merely non-limiting examples. In these examples, the anti-color filter array portions 400a, 400b and 400c are only parts of complete anti-color filter arrays 107.

FIG. 4A shows an anti-color filter array portion 400a. According to this implementation, the anti-color filter array portion 400a includes multiple instances of the anti-color filter pattern 401a. In this example, the anti-color filter pattern 401a includes a first anti-color filter region 405a (ACFR1) and a second anti-color filter region 405b (ACFR2). In some examples, each of the first anti-color filter regions 405a may include a first anti-color filter being configured to at least partially suppress transmission of light in a first optical wavelength range and each of the second anti-color filter regions 405b may include a second anti-color filter being configured to at least partially suppress transmission of light in a second optical wavelength range. However, in other examples either the first anti-color filter regions 405a or the second anti-color filter regions 405b may be transparent, or substantially transparent.

FIG. 4B shows an anti-color filter array portion 400b. According to this implementation, the anti-color filter array portion 400b includes multiple instances of the anti-color filter pattern 401b. In this example, the anti-color filter pattern 401a includes a first anti-color filter region 405a, a second anti-color filter region 405b, a third anti-color filter region 405c and a fourth anti-color filter region 405d. In some examples, each of the first anti-color filter regions 405a may include a first anti-color filter being configured to at least partially suppress transmission of light in a first optical wavelength range, each of the second anti-color filter regions 405b may include a second anti-color filter being configured to at least partially suppress transmission of light in a second optical wavelength range, each of the third anti-color filter regions 405c may include a third anti-color filter being configured to at least partially suppress transmission of light in a third optical wavelength range and each of the fourth anti-color filter regions 405d may include a fourth anti-color filter being configured to at least partially suppress transmission of light in a fourth optical wavelength range.

However, in other examples one or more of the first anti-color filter regions 405a, the second anti-color filter regions 405b, the third anti-color filter regions 405c or the fourth anti-color filter regions 405d may be transparent, or substantially transparent. In one such example, each of the first anti-color filter regions 405a includes a first anti-color filter being configured to at least partially suppress transmission of light in a first optical wavelength range, but the second anti-color filter regions 405b, the third anti-color filter regions 405c and the fourth anti-color filter regions 405d are transparent, or substantially transparent.

In another example of the anti-color filter pattern 401b, one of the anti-color filter regions is configured to at least partially suppress transmission of light in a first optical wavelength range and another of the anti-color filter regions is configured to at least partially suppress transmission of light in a second, third or fourth optical wavelength range. However, in this example the other two anti-color filter regions of the anti-color filter pattern 401b are transparent, or substantially transparent.

In an alternative example of the anti-color filter pattern 401b, one of the anti-color filter regions is configured to at least partially suppress transmission of light in a first optical wavelength range, another of the anti-color filter regions is configured to at least partially suppress transmission of light in a second optical wavelength range and another of the anti-color filter regions is configured to at least partially suppress transmission of light in a third optical wavelength range. However, in this example the other anti-color filter region of the anti-color filter pattern 401b is transparent, or substantially transparent.

FIG. 4C shows an anti-color filter array portion 400c. According to this implementation, the anti-color filter array portion 400c includes multiple instances of the anti-color filter pattern 401c. In this example, the anti-color filter pattern 401c includes a first anti-color filter region 405a, a second anti-color filter region 405b, a third anti-color filter region 405c, a fourth anti-color filter region 405d, a fifth anti-color filter region 405e and a sixth anti-color filter region 405f. In some examples, each of the first anti-color filter regions 405a may include a first anti-color filter being configured to at least partially suppress transmission of light in a first optical wavelength range, each of the second anti-color filter regions 405b may include a second anti-color filter being configured to at least partially suppress transmission of light in a second optical wavelength range, each of the third anti-color filter regions 405c may include a third anti-color filter being configured to at least partially suppress transmission of light in a third optical wavelength range, each of the fourth anti-color filter regions 405d may include a fourth anti-color filter being configured to at least partially suppress transmission of light in a fourth optical wavelength range, each of the fifth anti-color filter regions 405e may include a fifth anti-color filter being configured to at least partially suppress transmission of light in a fifth optical wavelength range and each of the sixth anti-color filter regions 405f may include a sixth anti-color filter being configured to at least partially suppress transmission of light in a sixth optical wavelength range.

However, in other examples one or more of the anti-color filter regions of the anti-color filter pattern 401c may be transparent, or substantially transparent. In one such example, each of the first anti-color filter regions 405a includes a first anti-color filter being configured to at least partially suppress transmission of light in a first optical wavelength range, but all of the other anti-color filter regions are transparent, or substantially transparent.

In another example of the anti-color filter pattern 401c, one of the anti-color filter regions is configured to at least partially suppress transmission of light in a first optical wavelength range and another of the anti-color filter regions is configured to at least partially suppress transmission of light in another optical wavelength range. However, in this example the other four anti-color filter regions of the anti-color filter pattern 401c are transparent, or substantially transparent.

In an alternative example of the anti-color filter pattern 401c, one of the anti-color filter regions is configured to at least partially suppress transmission of light in a first optical wavelength range, another of the anti-color filter regions is configured to at least partially suppress transmission of light in a second optical wavelength range and another of the anti-color filter regions is configured to at least partially suppress transmission of light in a third optical wavelength range. However, in this example the other three anti-color filter regions of the anti-color filter pattern 401c are transparent, or substantially transparent.

In an alternative example of the anti-color filter pattern 401c, one of the anti-color filter regions is configured to at least partially suppress transmission of light in a first optical wavelength range, another of the anti-color filter regions is configured to at least partially suppress transmission of light in a second optical wavelength range, another of the anti-color filter regions is configured to at least partially suppress transmission of light in a third optical wavelength range and another of the anti-color filter regions is configured to at least partially suppress transmission of light in a fourth optical wavelength range. However, in this example the other two anti-color filter regions of the anti-color filter pattern 401c are transparent, or substantially transparent.

In an alternative example of the anti-color filter pattern 401c, one of the anti-color filter regions is configured to at least partially suppress transmission of light in a first optical wavelength range, another of the anti-color filter regions is configured to at least partially suppress transmission of light in a second optical wavelength range, another of the anti-color filter regions is configured to at least partially suppress transmission of light in a third optical wavelength range, another of the anti-color filter regions is configured to at least partially suppress transmission of light in a fourth optical wavelength range and another of the anti-color filter regions is configured to at least partially suppress transmission of light in a fifth optical wavelength range. However, in this example the other anti-color filter region of the anti-color filter pattern 401c is transparent, or substantially transparent.

Figure 5:
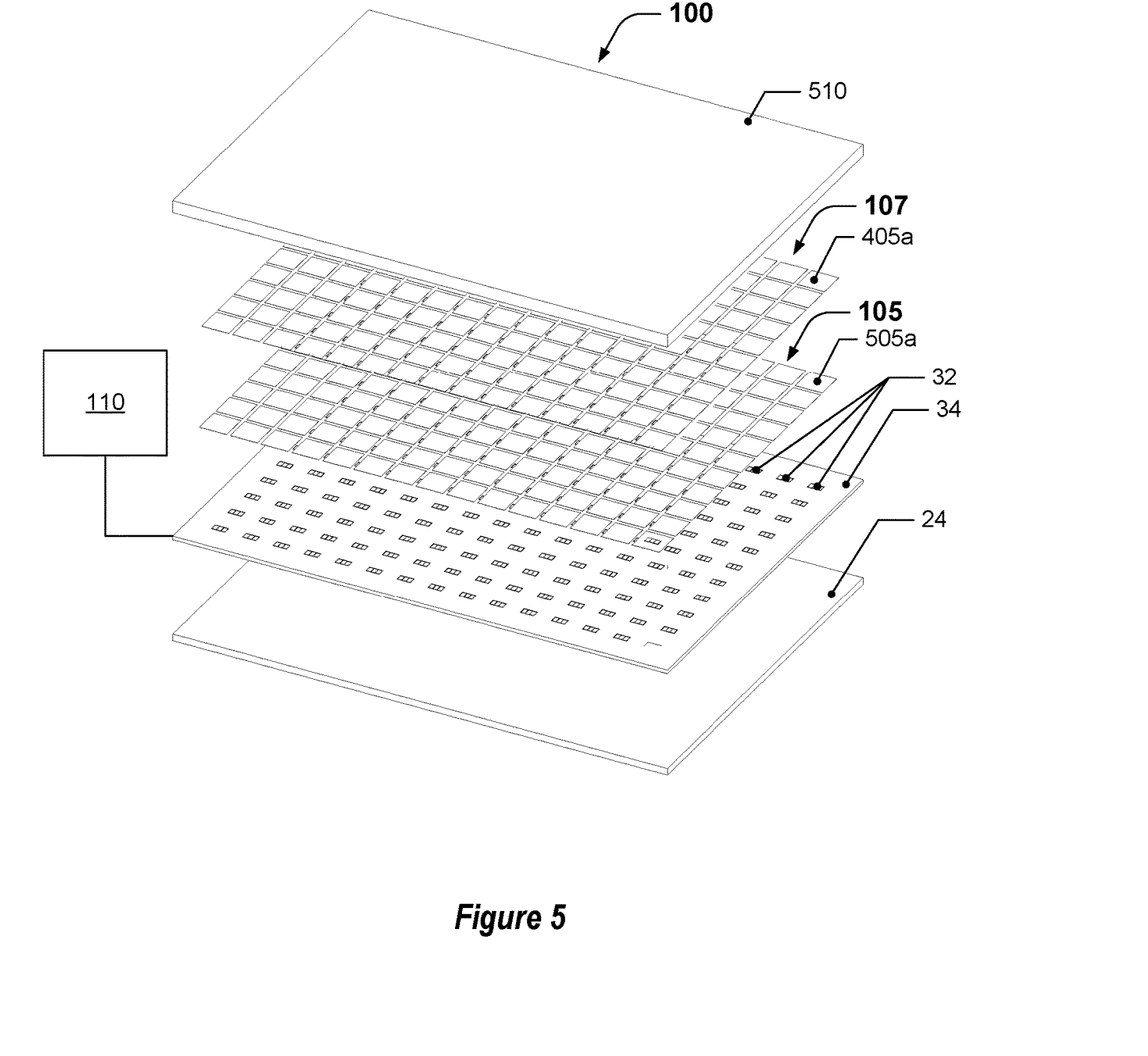
FIG. 5 shows an example of an exploded view of an apparatus according to some implementations.

FIG. 5 shows an example of an exploded view of an apparatus according to some implementations. According to some implementations, the apparatus 100 may be an example of the apparatus 100 that is shown in FIG. 1 and described above. In this example, the apparatus 100 includes an array of optical sensor pixels 105, an anti-color filter array 107 proximate the array of optical sensor pixels 105 and a cover layer 510 proximate the anti-color filter array 107. The cover layer 510 may be formed of any suitable transparent or substantially transparent material, such as glass, plastic, etc.

According to this implementation, there is a one-to-one correspondence between individual anti-color filter regions of the anti-color filter array 107 and individual optical sensor pixels of the array of optical sensor pixels 105. For example, when the apparatus 100 is configured for operation, the anti-color filter region 405a is adjacent to the optical sensor pixel 505a. However, in other implementations there may not be a one-to-one correspondence between individual anti-color filter regions and optical sensor pixels. For example, in some implementations, multiple optical sensor pixels may correspond with a single anti-color filter region, or vice versa.

According to this implementation, the apparatus 100 includes an array of optical sensor pixel circuits 32 disposed on a substrate 34, which also may be referred to as a backplane. In this implementation, an outer substrate 24 is proximate the backplane. The outer substrate 24 may be formed of any suitable protective material, such as plastic, glass, metal, etc. In this example, each of the optical sensor pixel circuits 32 corresponds to, and is electrically connected to, a corresponding one of the optical sensor pixels of the array of optical sensor pixels 105. In some implementations, each sensor pixel circuit 32 may include one or more TFT elements, electrical interconnect traces and, in some implementations, one or more additional circuit elements such as diodes, capacitors, etc. According to this example, the apparatus 100 includes a control system 110 that is configured to communicate with the array of optical sensor pixels 105 via the sensor pixel circuits 32 on the substrate 34.

The control system 110 may be configured to operate as disclosed herein, e.g., as described above with reference to method 200. For example, the control system 106 may be configured for receiving optical sensor pixel values from the array of optical sensor pixels 105 (in this example, via the sensor pixel circuits 32), for analyzing the optical sensor pixel values to detect at least a first object and for determining first object color information.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. A system, comprising:
an array of optical sensor pixels;
an anti-color filter array proximate the array of optical sensor pixels, the anti-color filter array including at least a first plurality of first anti-color filters, each of the first anti-color filters being proximate a corresponding instance of a first plurality of optical sensor pixels, each of the first anti-color filters being configured to at least partially suppress transmission of light in a first optical wavelength range; and
a control system configured for:
receiving optical sensor pixel values from the array of optical sensor pixels;
analyzing the optical sensor pixel values to detect at least a first object; and
determining first object color information, wherein determining the first object color information comprises:
obtaining at least one first optical sensor value from at least one first optical sensor pixel corresponding to the first object, the at least one first optical sensor pixel being at least one instance of the first plurality of optical sensor pixels;
obtaining at least one second optical sensor value from at least one second optical sensor pixel corresponding to the first object, the at least one second optical sensor pixel not being at least one instance of the first plurality of optical sensor pixels; and
comparing the at least one first optical sensor value and the at least one second optical sensor value.

2. The system of claim 1, wherein the anti-color filter array includes a second plurality of second anti-color filters, each of the second anti-color filters being proximate a corresponding instance of a second plurality of optical sensor pixels, each of the second anti-color filters being configured to at least partially suppress transmission of light in a second optical wavelength range.

3. The system of claim 2, wherein the at least one second optical sensor pixel is at least one instance of the second plurality of optical sensor pixels.

4. The system of claim 2, wherein the anti-color filter array includes groups of identical anti-color filter patterns, each of the identical anti-color filter patterns including at least one instance of the first anti-color filters and at least one instance of the second anti-color filters.

5. The system of claim 2, wherein the anti-color filter array includes a third plurality of third anti-color filters, each of the third anti-color filters being proximate a corresponding instance of a third plurality of optical sensor pixels, each of the third anti-color filters being configured to at least partially suppress transmission of light in a third optical wavelength range.

6. The system of claim 5, wherein the control system is configured for obtaining at least one third optical sensor value from at least one third optical sensor pixel corresponding to the first object, the at least one third optical sensor pixel being at least one instance of the third plurality of optical sensor pixels.

7. The system of claim 6, wherein determining the first object color information comprises comparing the at least one third optical sensor value with the at least one first optical sensor value and the at least one second optical sensor value.

8. The system of claim 5, wherein the anti-color filter array includes groups of identical anti-color filter patterns, each of the identical anti-color filter patterns including at least one instance of the first anti-color filters, at least one instance of the second anti-color filters and at least one instance of the third anti-color filters.

9. The system of claim 1, wherein determining the first object color information involves aggregating optical sensor pixel values.

10. The system of claim 1, wherein analyzing the optical sensor pixel values to detect at least a first object involves comparing the optical sensor pixel values to a background model.

11. The system of claim 1, wherein the anti-color filter array includes a plurality of transparent or substantially transparent regions.

12. A method, comprising:
receiving optical sensor pixel values from an array of optical sensor pixels;
analyzing the optical sensor pixel values to detect at least a first object; and
determining first object color information, wherein determining the first object color information comprises:
obtaining at least one first optical sensor value from at least one first optical sensor pixel corresponding to the first object, the at least one first optical sensor pixel being at least one instance of a first plurality of optical sensor pixels having received light that is suppressed in a first optical wavelength range;
obtaining at least one second optical sensor value from at least one second optical sensor pixel corresponding to the first object, the at least one second optical sensor pixel not being at least one instance of the first plurality of optical sensor pixels; and
comparing the at least one first optical sensor value and the at least one second optical sensor value.

13. The method of claim 12, wherein the at least one second optical sensor pixel is at least one instance of a second plurality of optical sensor pixels having received light that is suppressed in a second optical wavelength range.

14. The method of claim 13, wherein determining the first object color information further comprises obtaining at least one third optical sensor value from at least one third optical sensor pixel corresponding to the first object, the at least one third optical sensor pixel being at least one instance of a third plurality of optical sensor pixels having received light that is suppressed in a third optical wavelength range.

15. The method of claim 14, wherein determining the first object color information comprises comparing the at least one third optical sensor value with the at least one first optical sensor value and the at least one second optical sensor value.

16. The method of claim 12, wherein determining the first object color information involves aggregating optical sensor pixel values.

17. The method of claim 12, wherein analyzing the optical sensor pixel values to detect at least a first object involves comparing the optical sensor pixel values to a background model.

18. An apparatus, comprising:
an array of optical sensor pixels;
an anti-color filter array proximate the array of optical sensor pixels, the anti-color filter array comprising:
a first plurality of first anti-color filters, each of the first anti-color filters being proximate a corresponding instance of a first plurality of optical sensor pixels, each of the first anti-color filters being configured to at least partially suppress transmission of light in a first optical wavelength range;
a second plurality of second anti-color filter regions, each of the second anti-color filter regions being proximate a corresponding instance of a second plurality of optical sensor pixels, each of the second anti-color filter regions not being configured to suppress transmission of light in the first optical wavelength range;
an interface system; and
a control system configured for:
receiving, from a device and via the interface system, a request for optical sensor pixel values from the array of optical sensor pixels, the optical sensor pixel values including first optical sensor pixel values corresponding to the first plurality of optical sensor pixels and second optical sensor pixel values corresponding to the second plurality of optical sensor pixels;
obtaining the optical sensor pixel values; and
transmitting, via the interface system, the optical sensor pixel values to the device.

19. The apparatus of claim 18, wherein the second plurality of second anti-color filter regions comprises a second plurality of second anti-color filters, each of the second anti-color filters being proximate a corresponding instance of the second plurality of optical sensor pixels, each of the second anti-color filters being configured to at least partially suppress transmission of light in a second optical wavelength range.

20. The apparatus of claim 19, wherein the anti-color filter array includes groups of identical anti-color filter patterns, each of the identical anti-color filter patterns including at least one instance of the first anti-color filters and at least one instance of the second anti-color filters.

21. The apparatus of claim 19, wherein the anti-color filter array includes a third plurality of third anti-color filters, each of the third anti-color filters being proximate a corresponding instance of a third plurality of optical sensor pixels, each of the third anti-color filters being configured to at least partially suppress transmission of light in a third optical wavelength range.

22. The apparatus of claim 21, wherein the control apparatus is configured for obtaining at least one third optical sensor value from at least one third optical sensor pixel corresponding to the first object, the at least one third optical sensor pixel being at least one instance of the third plurality of optical sensor pixels.

23. The apparatus of claim 22, wherein the anti-color filter array includes groups of identical anti-color filter patterns, each of the identical anti-color filter patterns including at least one instance of the first anti-color filters, at least one instance of the second anti-color filters and at least one instance of the third anti-color filters.

24. The apparatus of claim 18, wherein analyzing the optical sensor pixel values to detect at least a first object involves comparing the optical sensor pixel values to a background model.

25. The apparatus of claim 18, wherein the anti-color filter array includes a plurality of transparent or substantially transparent regions.

26. One or more non-transitory media having software stored thereon, the software including instructions for controlling one or more devices to perform a method, the method comprising:
receiving optical sensor pixel values from an array of optical sensor pixels;
analyzing the optical sensor pixel values to detect at least a first object; and
determining first object color information, wherein determining the first object color information comprises:
obtaining at least one first optical sensor value from at least one first optical sensor pixel corresponding to the first object, the at least one first optical sensor pixel being at least one instance of a first plurality of optical sensor pixels having received light that is suppressed in a first optical wavelength range;
obtaining at least one second optical sensor value from at least one second optical sensor pixel corresponding to the first object, the at least one second optical sensor pixel not being at least one instance of the first plurality of optical sensor pixels; and
comparing the at least one first optical sensor value and the at least one second optical sensor value.

27. The one or more non-transitory media of claim 26, wherein the at least one second optical sensor pixel is at least one instance of a second plurality of optical sensor pixels having received light that is suppressed in a second optical wavelength range.

28. The one or more non-transitory media of claim 27, wherein determining the first object color information further comprises:
obtaining at least one third optical sensor value from at least one third optical sensor pixel corresponding to the first object, the at least one third optical sensor pixel being at least one instance of a third plurality of optical sensor pixels having received light that is suppressed in a third optical wavelength range; and
comparing the at least one third optical sensor value with the at least one first optical sensor value and the at least one second optical sensor value.

29. The one or more non-transitory media of claim 26, wherein determining the first object color information involves aggregating optical sensor pixel values.

30. The one or more non-transitory media of claim 26, wherein analyzing the optical sensor pixel values to detect at least a first object involves comparing the optical sensor pixel values to a background model.

* * * * *